United States Patent
Hayashi

(10) Patent No.: US 8,081,574 B2
(45) Date of Patent: Dec. 20, 2011

(54) MONITOR DEVICE AND BROADCAST RADIO WAVE RETRANSMISSION SYSTEM

(75) Inventor: Michinari Hayashi, Aichi (JP)

(73) Assignee: Masprodenkoh Kabushikikaisha, Aichi (JP)

( * ) Notice: Subject to any disclaimer, the term of this patent is extended or adjusted under 35 U.S.C. 154(b) by 720 days.

(21) Appl. No.: 12/095,554

(22) PCT Filed: Nov. 30, 2006

(86) PCT No.: PCT/JP2006/324009
§ 371 (c)(1),
(2), (4) Date: May 30, 2008

(87) PCT Pub. No.: WO2007/063968
PCT Pub. Date: Jun. 7, 2007

(65) Prior Publication Data
US 2010/0265830 A1    Oct. 21, 2010

(30) Foreign Application Priority Data
Nov. 30, 2005  (JP) .................. 2005-346470

(51) Int. Cl.
*H04L 12/26* (2006.01)
(52) U.S. Cl. .................. 370/242; 370/252; 714/48
(58) Field of Classification Search .......... 370/242–245, 370/252, 253; 714/100, 1, 48
See application file for complete search history.

(56) References Cited

U.S. PATENT DOCUMENTS

| | | | | |
|---|---|---|---|---|
| 2003/0123420 A1* | 7/2003 | Sherlock | | 370/338 |
| 2003/0232622 A1* | 12/2003 | Seo et al. | | 455/437 |
| 2007/0066275 A1* | 3/2007 | Nagy et al. | | 455/403 |

FOREIGN PATENT DOCUMENTS

| | | |
|---|---|---|
| JP | 9200159 | 7/1997 |
| JP | 2003 198566 | 7/2003 |
| JP | 2003 332964 | 11/2003 |
| JP | 2004 112271 | 4/2004 |
| JP | 2004 248078 | 9/2004 |

* cited by examiner

Primary Examiner — Pao Sinkantarakorn
(74) Attorney, Agent, or Firm — Davis & Bujold, P.L.L.C.

(57) ABSTRACT

A monitor device includes a packet communication device, a report data transmitting device, a communication status determination device, and a transmission error history storage device. The report data transmitting device transmits report data for reporting an error of a broadcast radio wave retransmission system to an external monitoring center through the packet communication device. The communication status determination device determines whether or not transmission of the report data is successfully performed by the report data transmitting device. The transmission error history storage device stores an error in the report data transmission, when the communication status determination device determines that an error occurs in transmission of the report data, as a transmission error history in a storage device.

12 Claims, 7 Drawing Sheets

FIG.7

TRANSMISSION ERROR HISTORY

| TIME PERIOD | NUMBER OF TRANSMISSION FAILURE |
|---|---|
| 0:00-1:00 | 0 |
| 1:00-2:00 | 0 |
| 2:00-3:00 | 16 |
| 3:00-4:00 | 5 |
| 4:00-5:00 | 0 |
| ⋮ | ⋮ |
| 22:00-23:00 | 0 |
| 23:00-24:00 | 0 |

US 8,081,574 B2

MONITOR DEVICE AND BROADCAST RADIO WAVE RETRANSMISSION SYSTEM

TECHNICAL FIELD

The present invention relates to a monitor device that is suitable, in a broadcast radio wave retransmission system which receives broadcast radio waves from a broadcast station and retransmits the radio waves to areas where the radio waves do not reach, for monitoring the operational status of the system and, when an error occurs, reporting the error to an external monitoring center. The present invention also relates to a broadcast radio wave retransmission system including such monitor device.

BACKGROUND ART

Conventionally, digital broadcasting for mobile devices (mobile broadcasting) by using a satellite has been in practical use. In the mobile broadcasting, retransmission of broadcast radio waves is performed so that broadcast radio waves from a satellite can be received in areas where the broadcast radio waves do not reach (such as areas hidden by buildings, underground malls, inside of tunnels, and so on).

Such retransmission system for broadcast radio waves is known as a so-called gap filler device, and is generally configured as follows. The retransmission system firstly receives broadcast radio waves, transmitted from a satellite, by a receiving antenna, and generates broadcast signals for retransmission by amplifying the received signals by an amplifying device and the like and converting frequencies of the signals by a downconverter and the like. Then, the retransmission system transmits the generated broadcast signals to transmitting amplifiers, disposed in areas where the broadcast radio waves do not reach, so as to make the transmitting amplifiers amplify the broadcast signals and to input the amplified broadcast signals into transmitting antennas. Consequently, the broadcast radio waves are retransmitted from the transmitting antennas.

Moreover, this type of retransmission system is usually provided with a monitor device which monitors the operational status of the system by detecting an input level of broadcast signals into the transmitting amplifiers, an output level of broadcast signals from the transmitting amplifiers to the transmitting antennas, and so on. The monitor device is adopted so as to automatically report an error to an external monitoring center when the monitor device detects an error in the system (for example, see Patent Documents 1, 2).

Patent Document 1: Unexamined Japanese Patent Publication No. 2003-332964
Patent Document 2: Unexamined Japanese Patent Publication No. 2004-248078

DISCLOSURE OF THE INVENTION

Problems to be Solved by the Invention

In such broadcast radio wave retransmission system, when an error is reported to an external monitoring center from the monitor device in the system, wireless communication in which wiring is not necessary is generally used. If a wireless communication line exclusively for the system is used, even wireless communication can cause cost increase, because a separate wireless terminal needs to be disposed. Therefore, a packet communication network for mobile devices (such as a cell phone and a personal digital assistant) is usually used.

However, if a public packet communication network for mobile devices is used so as to report a system error from the monitor device to an external monitoring center, a system error sometimes cannot be reported from the monitor device to the monitoring center, because of too much access to the base station from other mobile devices during some hours.

In a case wherein a system error cannot be reported from the monitor device to the monitoring center as described above, a system administrator would receive a complaint from users with regard to an inability to receive broadcast radio waves, and would take some action, such as an inspection, repair and so on of the retransmission system. In an attempt so as to inspect/repair the system, an inspection of the monitor device is also needed, which makes the work more cumbersome and complicated.

That is, there can be two reasons why a system error cannot be reported from the monitor device to the monitoring center: one is due to malfunction (including accidental failures) in the monitor device itself, another is due to the above-described public packet communication network being crowded. Conventionally, when a system error cannot be reported from the monitor device to the monitoring center, determination cannot be made whether or not the failure is caused by the congestion of the public packet communication network.

Therefore, there has been a problem in that, when a system error cannot be reported from the monitor device to the monitoring center, even if the failure is caused by the congestion of public packet communication network, the monitor device conventionally needs to be inspected so as to specify the cause, and that such work is troublesome and costly.

In the above-described case, if, for example, the monitor device temporarily malfunctions due to an environmental change and the like, an incorrect determination can be made, wherein the cause of the failure in reporting the system error is determined to be due to the congestion of the public packet communication network, because the state of the malfunction cannot be reproduced when the monitor device is inspected. Therefore, there has been a problem in that a malfunctioning monitor device can be continuingly used.

The present invention is made in consideration of the above-described problems. An object of the present invention is to provide a technique, in a monitor device configured so as to report an error to a monitoring center through a public packet communication network for mobile devices when an error occurs in a broadcast radio wave retransmission system (so-called gap filler device), which enables to easily and correctly specify a cause when a system error cannot be reported from the monitor device to a monitoring center, and enables efficient inspection/repair of the broadcast radio wave retransmission system.

Means for Solving the Problem

In the invention made so as to achieve the above-described object and disclosed in claim 1, a monitor device is provided to a broadcast radio wave retransmission system that includes a receiving device and a transmitting device. The receiving device receives broadcast radio waves transmitted from a broadcast station, and processes received signals so as to output the received signals as broadcast signals for retransmission. The transmitting device is disposed in an area where the broadcast radio waves do not reach. The transmitting device amplifies the broadcast signals to a predetermined transmission level, and output the broadcast signals to a transmitting antenna so that broadcast radio waves corresponding to the broadcast signals are retransmitted from the transmitting antenna. The monitor device monitors an operational status of the system and, when an error occurs, reports the error to an external monitoring center, and includes a packet communication device, a report data transmitting device, a communication status determination device, and a transmission error history storage device. The packet communication device performs wireless data communication with an external device through a public packet communication network for mobile devices. The report data transmitting device transmits report data, when an error occurs in the system, so as to report the error to the monitoring center through the packet communication device. The communication status determination device determines whether or not transmission of report data is successfully performed by the report data transmitting device. The transmission error history storage device stores an error, when the communication status determination device determines that an error occurs in transmission of the report data, as a transmission error history in a storage device.

In the invention disclosed in claim 2, the monitor device according to claim 1 includes a transmission error history transmitting device that sends the transmission error history, stored in the storage device, from the packet communication device to an external device including the monitoring center, when the packet communication device receives a transmission request for the transmission error history from the external device, through the public packet communication network.

In the invention disclosed in claim 3, the monitor device according to claim 2 includes a first transmission error history deleting device that deletes the transmission error history, stored in the storage device, when the packet communication device receives, from the external device through the public packet communication network, a deletion instruction for deleting the transmission error history.

In the invention disclosed in claim 4, the monitor device according to any one of claims 1-3 includes a communication interface and a transmission error history output device. To the communication interface, an external information processing device is directly connected so as to perform data communication. The transmission error history output device outputs the transmission error history, stored in the storage device, to the information processing device through the communication interface, when the transmission error history output device receives a transmission request for the transmission error history from the information processing device through the communication interface.

In the invention disclosed in claim 5, the monitor device according to claim 4 includes a second transmission error history deleting device that deletes the transmission error history, stored in the storage device, when the second transmission error history deleting device receives, from the information processing device through the communication interface, a deletion instruction for deleting the transmission error history.

In the invention disclosed in claim 6, the monitor device according to any one of claims 1 to 5 includes a retransmission instruction device that makes the report data transmitting device retransmit the report data, when the communication status determination device determines that an error occurs in transmission of the report data.

In the invention disclosed in claim 7, the transmission error history storage device of the monitor device according to any one of claims 1 to 6 performs counting, in each predetermined period of time, in regard to a number of errors determined in transmission of the report data by the communication status determination device, and stores a result of the counting in the storage device as a transmission error history.

In the invention disclosed in claim 8, the storage device of the monitor device according to any one of claims 1 to 7 is a nonvolatile memory that is capable of maintaining a memory content, even when power supply is cut off.

In the invention disclosed in claim 9, a broadcast radio wave retransmission system includes a receiving device, a transmitting device, and the monitor device according to any one of claims 1 to 8. The receiving device receives broadcast radio waves transmitted from a broadcast station, and processes received signals so as to output the received signals as broadcast signals for retransmission. The transmitting device is disposed in an area where the broadcast radio waves do not reach. The transmitting device amplifies the broadcast signals to a predetermined transmission level, and output the broadcast signals to a transmitting antenna so that broadcast radio waves corresponding to the broadcast signals are retransmitted from the transmitting antenna. The monitor device monitors an operational status of the system and, when an error occurs, reports the error to an external monitoring center.

Effect of the Invention

The monitor device according to claim 1 is used so as to monitor the operational status of the broadcast radio wave retransmission system. When a system error is detected as a result of the monitoring, the report data transmitting device sends report data for reporting that an error is detected (i.e. a system error) to an external monitoring center through the packet communication device.

When the report data transmitting device sends the report data to the external monitoring center, the communication status determination device determines whether or not the transmission of the report data has been successfully performed. If the communication status determination device determines that an error has occurred in transmitting the report data, the transmission error history storage device stores that an error has occurred in transmitting the report data (i.e. an error in report data transmission) in the storage device as a transmission error history.

In the present invention, since the packet communication device performs wireless data communication with an external device through a public packet communication network for mobile devices, during some hours, such as commuting time, when the public packet communication network is intensively used by other mobile devices, report data sometimes cannot be sent to the monitoring center.

Therefore, the monitor device according to the present invention is adopted so as to monitor, when report data indicating a system error is sent to an external monitoring center, whether or not the report data has been successfully transmitted to the external monitoring center, and to store the transmission error as a transmission error history, when an error occurs in transmitting the report data.

As a result, by the monitor device according to the present invention, when an error of the broadcast radio wave retransmission system cannot be reported from the monitor device to the monitoring center, and a system administrator take some action, such as inspection, repair and so on of the broadcast radio wave retransmission system in response to a complaint from users with regard to an inability to receive broadcast radio waves, the cause why the system error cannot be reported from the monitor device to the monitoring center can be easily and accurately specified whether the system error occurs due to a congestion of the public packet communication network, or due to malfunction of the monitor device based on the transmission error history stored in the storage device.

Therefore, by the monitor device according to the present invention, when an error in the broadcast radio wave retransmission system cannot be reported from the monitor device to the monitoring center, inspection/repair of the broadcast radio wave retransmission system can be efficiently performed, and the cost for the inspection/repair work can be reduced.

In the monitor device according to claim 2, when the packet communication device receives a transmission request for the transmission error history from the external device through the public packet communication network, the transmission error history transmitting device sends the transmission error history, stored in the storage device, from the packet communication device to the external device.

Therefore, by the monitor device according to the present invention, when an error occurs in the broadcast radio wave retransmission system and the error cannot be reported from the monitor device to the monitoring center, a system administrator can perform a remotely controlled operation so as to check the transmission error history stored in the monitor device side by using the monitoring center or other information terminals, and the checking operation can be easily done.

In the monitor device according to claim 3, when the packet communication device receives a deletion instruction for deleting the transmission error history from the external device through the public packet communication network, the first transmission error history deleting device deletes the transmission error history stored in the storage device.

Therefore, by the monitor device according to the present invention, when an error occurs in the broadcast radio wave retransmission system and the error cannot be reported from the monitor device to the monitoring center, a system administrator is able not only to check the transmission error history stored in the monitor device side by using the monitoring center or other information terminals, but also to delete the transmission error history from the storage device after checking the history so as to reserve the storage area for a new transmission error history.

In the monitor device according to claim 4, the communication interface to which an external information processing device is directly connected so as to perform data communication is provided. When a transmission request for the transmission error history is received from the external information processing device through the communication interface, the transmission error history output device outputs the transmission error history, stored in the storage device, through the communication interface to the information processing device.

Therefore, by the monitor device according to the present invention, when a error in the broadcast radio wave retransmission system cannot be reported from the monitor device to the monitoring center, an operator who performs inspection/repair of the broadcast radio wave retransmission system can read the transmission error history directly from the monitor device by using an information processing device, and the operator can check the transmission error history in the working site.

In the monitor device according to claim 5, when a deletion instruction for deleting the transmission error history is received from the information processing device through the communication interface, the second transmission error history deleting device deletes the transmission error history stored in the storage device.

Therefore, by the monitor device according to the present invention, when an error occurs in the broadcast radio wave retransmission system and the error cannot be reported from the monitor device to the monitoring center, an operator who performs inspection/repair of the broadcast radio wave retransmission system is able not only to check the transmission error history in the working side, but also to delete the transmission error history from the storage device, after the checking is done, so as to reserve the storage area for a new transmission error history.

By the monitor device according to claim 6, when the communication status determination device determines that an error occurs in transmission of the report data, the retransmission instruction device makes the report data transmitting device retransmit the report data. Therefore, the probability for sending report data to the monitoring center can be increased, which can, in turn, inhibit an inspection of the broadcast radio wave retransmission system being delayed due to an error in report data transmission.

The retransmission instruction device may be adopted so as to repeatedly perform retransmission of report data, every time the communication status determination device determines that an error in transmission of report data occurs. However, since report data cannot be sometimes transmitted, despite several attempts at retransmission, depending on the hours, the number of retransmission is preferably limited to a predetermined number. In this way, data transmission from the packet communication device is inhibited from being repeatedly performed as much as to give a negative effect on communication performed by other mobile devices.

Moreover, since the hours when the public packet transmission network is less crowded and transmission error is less likely to occur can be found out from the transmission error history stored in the storage device, the retransmission instruction device may be configured so as to instruct retransmission of report data during the hours when transmission error is less likely to occur.

In this case, the hours when transmission error is less likely to occur may be arbitrarily determined by a system administrator, and set as retransmission hours when the retransmission instruction device performs retransmission. Alternatively, the retransmission instruction device may be adopted so as to analyze the transmission error history, and to automatically set the hours for retransmission.

By the monitor device according to claim 7, the transmission error history storage device performs counting, in each predetermined period of time, in regard to the number of errors determined in transmission of the report data by the communication status determination device, and stores the result of the counting in the storage device as a transmission error history.

For the transmission error history, the time when the communication status determination device determines that an error occurs in report data transmission may be sequentially stored. Furthermore, the time and the type of report data which cannot be transmitted may be sequentially stored. However, if the transmission error history is stored in the manner described in claim 7, the data amount of transmission error history stored in the storage device can be reduced.

The storage device, which stores the transmission error history, is preferably constituted with a nonvolatile memory, as described in claim 8, which can maintain the memory content, even when power supply is cut off.

In the broadcast radio wave retransmission system according to claim 9, the monitor device according to the above-described invention (claim 1 to claim 8) is provided as a monitor device that monitors the operational status of the system. Therefore, the same effect as in the monitor device according to the present invention can be exhibited.

BRIEF DESCRIPTION OF THE DRAWINGS

FIG. 7 is an explanatory view showing a composition of transmission error history stored in an EEPROM.

EXPLANATION OF REFERENTIAL NUMERALS

2 . . . receiving antenna, 4 . . . receiving amplifier, 6 . . . monitor device, 6a, 8a . . . power supply plug, 6b . . . connector for connecting an external device, 7 . . . antenna for monitoring, 8 . . . branching device, 10 . . . transmitting amplifier, 12 . . . transmitting antenna, 14 . . . terminating device, 21, 41, 81 . . . input terminal, 22, 42, 43, 47, 48, 83 . . . signal separation lightning arrester circuit, 23 . . . amplifier circuit, 24 . . . BPF, 25, 44, 84 . . . output terminal, 26, 52, 59 . . . LPF, 27, 53, 62, 93 . . . data demodulation unit, 28, 54, 57 . . . communication control unit, 31, 54a . . . temperature sensor, 32 . . . input level detection circuit, 33 . . . output level detection circuit, 34, 54b . . . voltage detection unit, 35, 55, 58, 95 . . . data modulation unit, 36, 56, 61 . . . HPF, 38, 88 . . . power supply circuit, 45, 51 . . . branch circuit, 46, 60 . . . distributor circuit, 49, 50 . . . branch terminal, 63, 85 . . . power supply switch, 64, 86 . . . fuse, 65, 87 . . . lightning arrester circuit, 66 . . . constant voltage circuit, 67 . . . voltage detection circuit, 68 . . . control voltage generation circuit, 69 . . . drive voltage generation circuit, 71-73 . . . direct-current voltage output circuit, 70a . . . selecting switch, 70b . . . drive circuit, 82 . . . power separation lightning arrester circuit, 90 . . . packet communication module, 91 . . . communication control unit, 91a . . . CPU, 91b . . . ROM, 91c . . . RAM, 91d . . . EEPROM, 91e . . . I/F for connecting a monitoring control unit, 91f . . . I/F for connecting an external device, 91g . . . timer for time measurement, 91h . . . I/F for packet communication, 91i . . . bus line, 94 . . . monitoring control unit.

BEST MODE FOR CARRYING OUT THE INVENTION

An embodiment according to the present invention will be described below with reference to the drawings.

Figure 1:
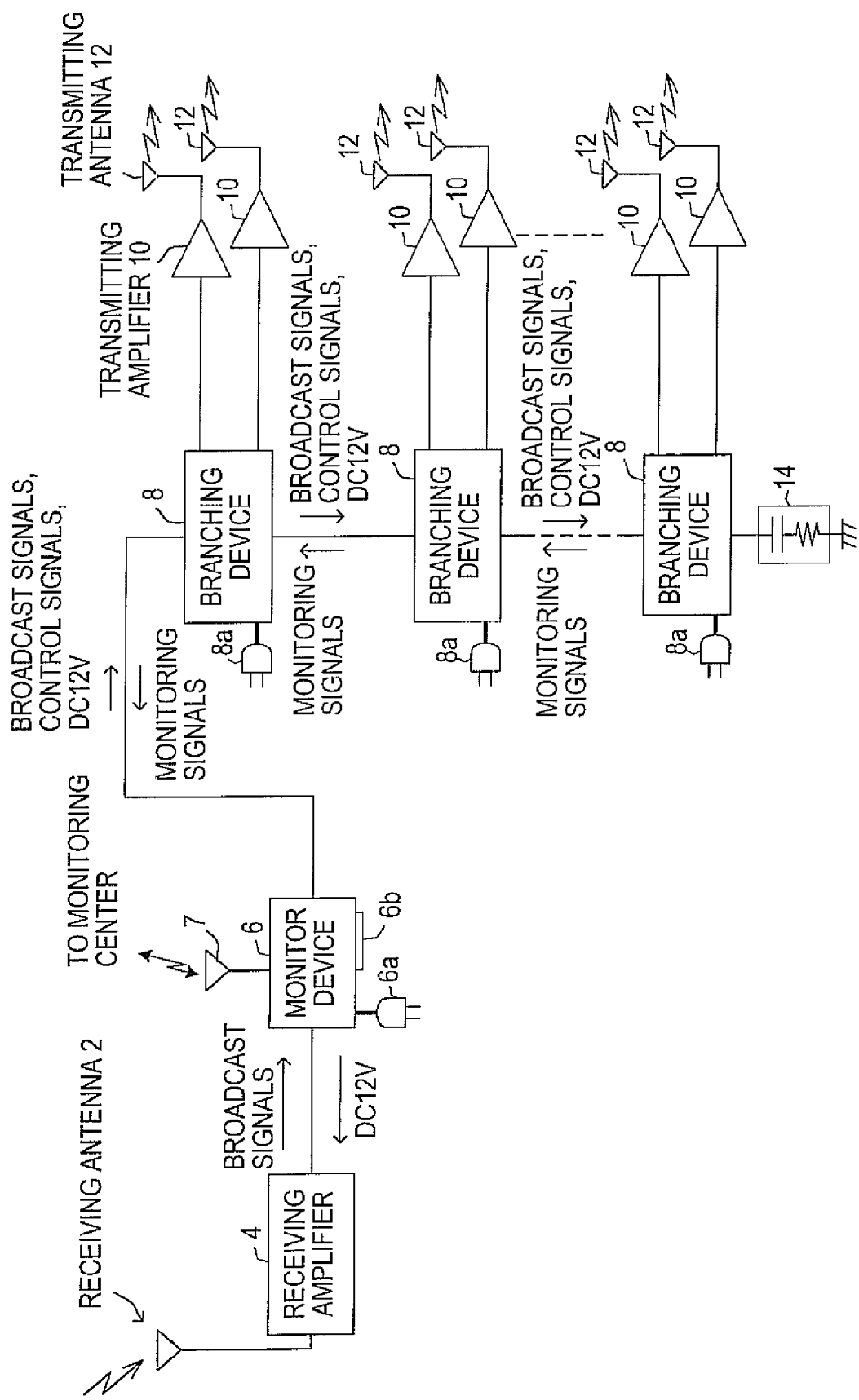
FIG. 1 is a block diagram showing a structure of a broadcast radio wave retransmission system according to an embodiment.

FIG. 1 is a block diagram showing the structure of a broadcast radio wave retransmission system (to be simply referred to as a retransmission system) to which the present invention is applied.

The retransmission system according to the present embodiment receives broadcast radio waves for mobile broadcasting, which is distributed from a satellite by using a frequency band at 2.6 GHz, by a receiving antenna 2, amplifies the received signals (broadcast signals) by a receiving amplifier 4, and transmits the broadcast radio waves received from the satellite to transmitting antennas 12, which are disposed in areas where the broadcast radio waves from the satellite cannot be directly received, in order to retransmit the broadcast radio waves for mobile broadcasting from the transmitting antennas 12 to inside of such areas (so-called gap filler device).

As shown in FIG. 1, the retransmission system according to the present embodiment includes a plurality of transmitting antennas 12 and a plurality of transmitting amplifiers 10. Two transmitting antennas 12 are disposed in each of plurality of areas, which are the target for retransmission, such as parking lots provided on each floor of a building, so that broadcast radio waves can be retransmitted to each of the plurality of areas. The plurality of transmitting amplifiers 10 inputs broadcast radio signals, amplified to a predetermined level, into each of the transmitting antennas 12.

To the receiving antenna 2, a transmission path, constituted with coaxial cables disposed so as to pass each of the above-described areas, is connected. On the transmission path (between the coaxial cables), branching devices 8 are disposed in each of the areas so as to diverge one part of the broadcast radio signals and to output the diverged signals to the transmitting amplifiers 10 disposed in each area (two transmitting amplifiers 10 in the present embodiment).

Moreover, on the transmission path (between the coaxial cables) between the receiving antenna 2 and the branching device 8 disposed in the upstream closest to the receiving antenna 2, a receiving amplifier 4 and a monitor device 6 are disposed. The receiving amplifier 4 amplifies broadcast signals outputted from the receiving antenna 2. The monitor device 6 outputs the broadcast signals outputted from the receiving amplifier 4 toward the branching devices 8 side. The monitor device 6 also monitors the operational status of the retransmission system based on monitor signals sent from the branching devices 8 side, and wirelessly sends the result of monitoring via an antenna 7 for monitoring to an external monitoring center.

In the monitor device 6, a power supply circuit 88 (see FIG. 4) is incorporated which generates power supply voltage for the circuit 88 itself to be operated and constant direct-current voltage (for example, DC 12V) when the circuit 88 receives power supply from an external commercial power supply outlet via a power plug 6a. To the receiving amplifier 4 disposed upstream of the monitor device 6, the constant direct-current voltage (DC 12V) generated in the power supply circuit 88 is supplied as power supply voltage, whereas the constant direct-current voltage (DC 12V) generated in the power supply circuit 88 is outputted to the branching devices 8, disposed downstream of the monitor device 6, as power supply instruction signals with respect to the transmitting amplifiers 10.

The monitor device 6 sends control signals to the branching devices 8 and the transmitting amplifiers 10, disposed in a terminal side, in accordance with an instruction from the external monitoring center so that monitoring signals, which indicate the operational statuses of these devices, are sent from the respective devices.

Figure 2:
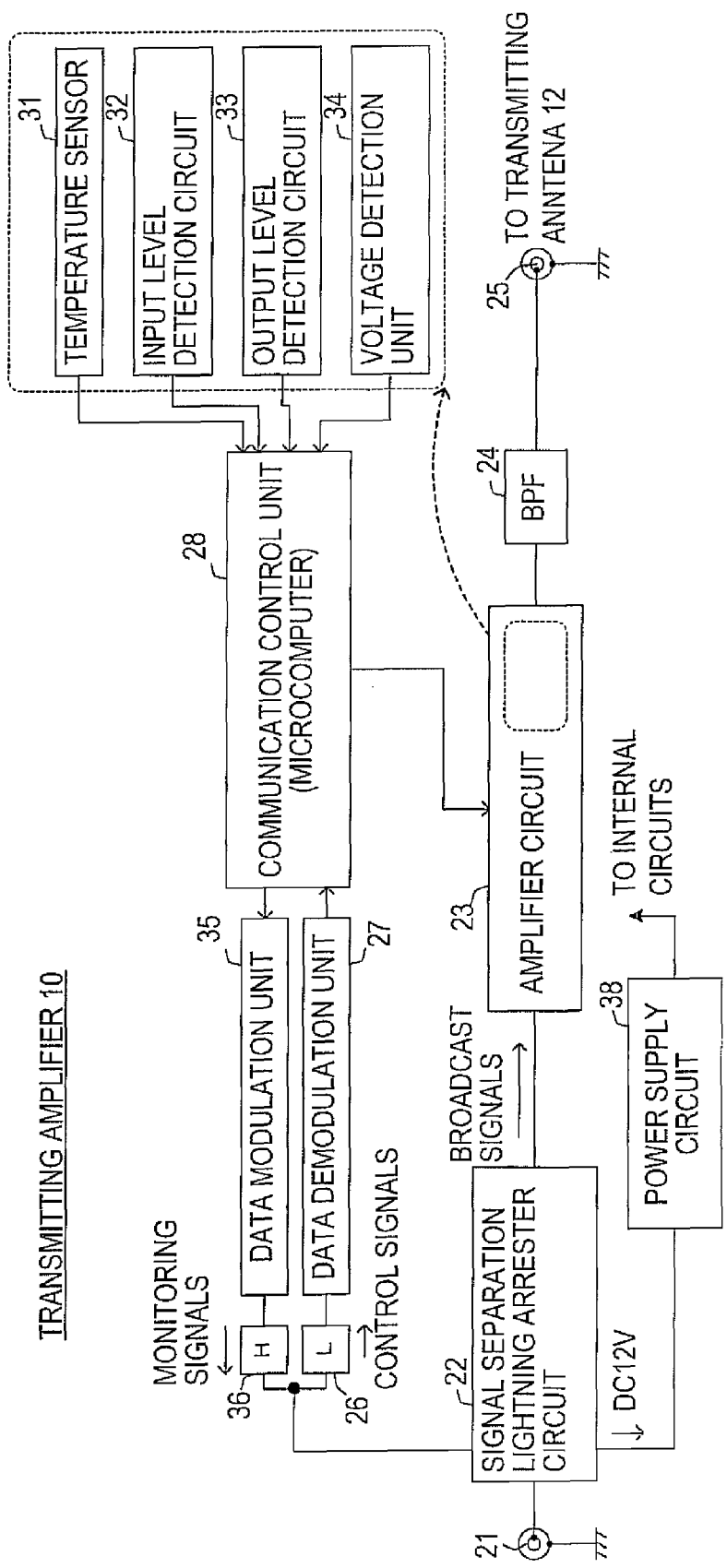
FIG. 2 is a block diagram showing a structure of transmitting amplifiers according to the embodiment.

FIG. 2 is a block diagram showing the structure of the transmitting amplifiers 10.

As shown in FIG. 2, each of the transmitting amplifiers 10 includes an input terminal 21, an output terminal 25, and a signal separation lightning arrester circuit 22. The input terminal 21 is connected to a branch terminal of one of the branching devices 8 by the coaxial cable. The output terminal 25 is connected to one of the transmitting antennas 12 by the coaxial cable.

The signal separation lightning arrester circuit 22 includes a filtering circuit and a lightning arrester circuit. The filtering circuit separates inputted signals, inputted to the input terminal 21 from the branching device 8 side, into broadcast signals in the 2.6 GHz band, control signals having a frequency lower than the frequency of the broadcast signals, and direct-current signals (i.e. DC 12V). The filtering circuit also outputs monitoring signals, which indicate the operational status of the above-referred transmitting amplifier 10, from the input terminal 21 to the branching device 8 side through a path separated from the path for the control signals. The lightning arrester circuit absorbs surge voltage generated by lightning and the like.

The broadcast signals, inputted from the branching device 8 side and separated by the signal separation lightning arrester circuit 22, are amplified in an amplifier circuit 23 to a predetermined transmission level, and then transmitted through a band pass filter (to be referred to as BPF) 24, which selectively allows a passage of broadcast signals only, to the output terminal 25. Subsequently, from the output terminal, the broadcast signals are outputted to the transmitting antenna 12.

The control signals, inputted from the branching device 8 side and separated by the signal separation lightning arrester circuit 22, are inputted to a data demodulation unit 27 through a low pass filter (to be referred to as LPF) 26, which blocks a passage of monitoring signals and selectively allow a passage of control signals. The control signals are converted into digital data for control (control data) in the data demodulation unit 27, and inputted into a communication control unit 28 constituted with a microcomputer.

According to the control data inputted from the data demodulation unit 27, the communication control unit 28 loads detected signals with regard to the temperature of the amplifier circuit 23, the input level and output level of the broadcast signals, the power supply voltage and so on from a temperature sensor 31, an input level detection circuit 32, an output level detection circuit 33, a voltage detection circuit 34 and so on, which are incorporated in the amplifier circuit 23. The communication control unit 28 outputs data, in which identification information and the like of the communication control unit 28 is added to the detected signals, to a data modulation unit 35, so as to make the data modulation unit 35 generate monitoring signals which indicate the operational status of the above-referred transmitting amplifier 10.

The monitoring signals, generated in the data modulation unit 35 as described above, are inputted to the signal separation lightning arrester circuit 22 via a high pass filter (to be referred to as HPF) 36, which blocks a passage of control signals and selectively allows a passage of monitoring signals, and outputted from the signal separation lightning arrester circuit 22 through the input terminal 21 to the branching device 8.

The direct-current signals (DC 12V), inputted from the branching device 8 side and separated by the signal separation lightning arrester circuit 22, are inputted to a power supply circuit 38, converted into power supply voltage for driving internal circuits, such as the amplifier circuit 23 and the like, in the power supply circuit 38, and supplied to the internal circuits.

Figure 3:
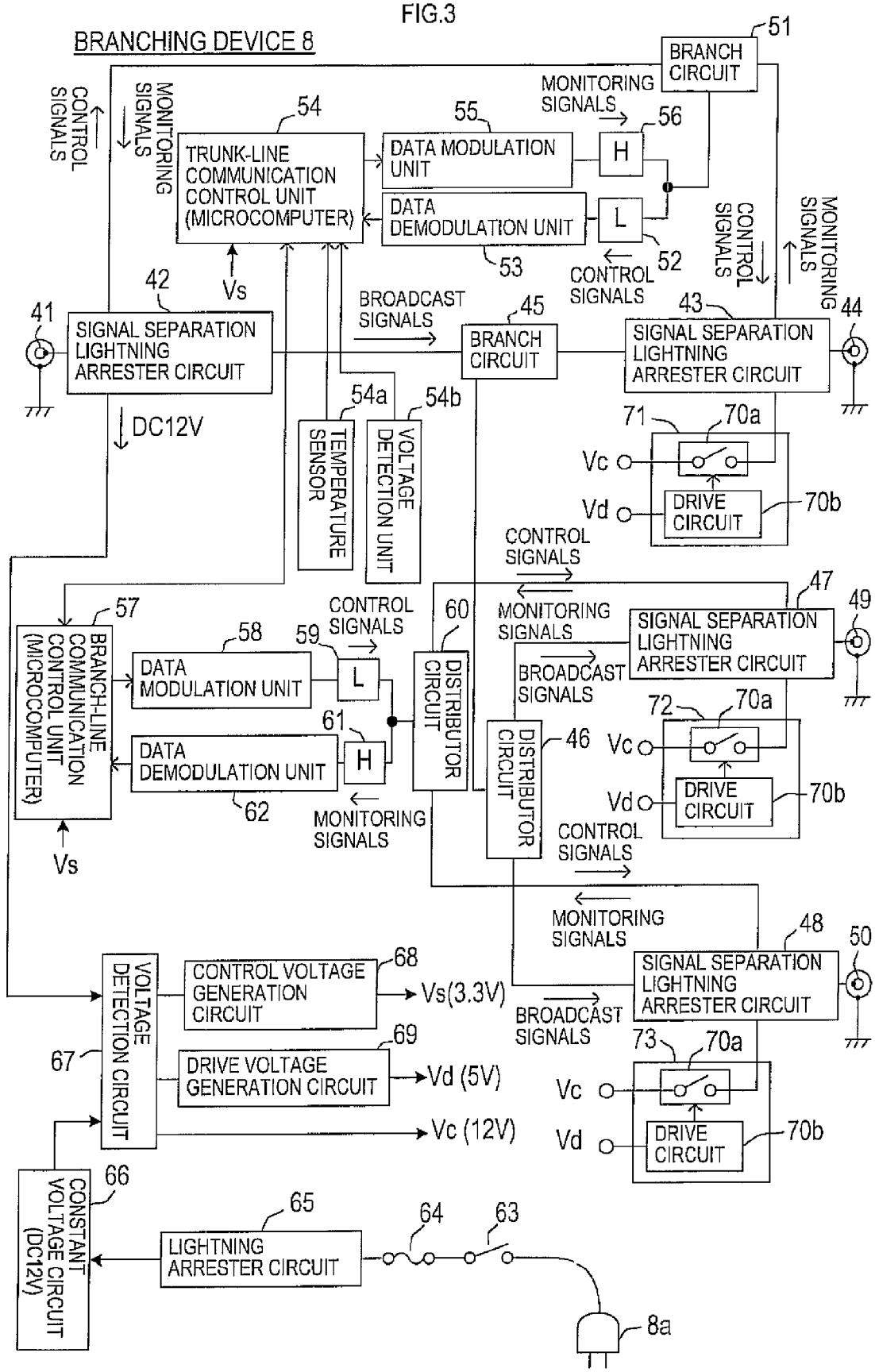
FIG. 3 is a block diagram showing a structure of branching devices according to the embodiment.

FIG. 3 is a block diagram showing the structure of the branching device 8.

As shown in FIG. 3, the branching device 8 includes an input terminal 41, an output terminal 44, and branch terminals 49, 50. The input terminal 41 is connected to the monitor device 6 side of the transmission path (coaxial cables) extending from the monitor device 6 toward the terminal side. The output terminal 44 is connected to the terminal side of the transmission path. The branch terminals 49, 50 are terminals for connecting two transmitting amplifiers 10.

In the branching device 8, a signal separation lightning arrester circuit 42 is provided. The signal separation lightning arrester circuit 42 includes, similarly to the signal separation lightning arrester circuit 22 of the transmitting amplifier 10, a filtering circuit and a lightning arrester circuit. The filtering circuit separates inputted signals, inputted to the input terminal 41 from the monitor device 6, into broadcast signals in the 2.6 GHz band, control signals having a frequency lower than the frequency of the broadcast signals, and direct-current signals (i.e. DC 12V). The filtering circuit also outputs monitoring signals, which indicate the operational statuses of the above-referred branching device 8 and the transmitting amplifiers 10 connected to the branch terminals 49, 50, from the input terminal 41 toward the monitor device 6 side through a path separated from the path for control signals. The lightning arrester circuit absorbs surge voltage generated by lightning and the like.

The branching device 8 also includes a signal separation lightning arrester circuit 43 constituted with a filtering circuit and a lightning arrester circuit. The filtering circuit mixes control signals and broadcast signals, which have passed through the inside of the branching device 8, and constant direct-current voltage Vc (DC 12V) generated in a constant voltage circuit 66, which will be described hereinafter, and outputs the mixed signals and voltage from the output terminal 44 toward the terminal side. The filtering circuit also introduces monitoring signals, inputted to the output terminal 44 from the terminal side, to an input path for control signals. The lightning arrester circuit absorbs surge voltage generated by lighting and the like.

Moreover, the branching device 8 also includes signal separation lightning arrester circuits 47, 48 respectively constituted with filtering circuits and lightning arrester circuits. The filtering circuits mix control signals and broadcast signals, which have passed through the inside of the branching device 8, and constant direct-current voltage Vc (DC 12V) generated in the constant voltage circuit 66, which will be described hereinafter, and respectively output the mixed signals and voltage from the branch terminals 49, 50 toward the transmitting amplifiers 10 side. The filtering circuits also introduce monitoring signals, inputted to the branch terminals 49, 50 from the transmitting amplifiers 10 side, to input path side for control signals. The lightning arrester circuits absorb surge voltage generated by lighting and the like.

The broadcast signals, inputted to the input terminal 41 from the upstream side of the transmission path and separated by the signal separation lightning arrester circuit 42, are inputted to a branch circuit 45, transmitted to the signal separation lightning arrester circuit 43 through an input/output path of the branch circuit 45 in a low-loss manner, and outputted to the terminal side through the separation lightning arrester circuit 43 and the output terminal 44.

The branch circuit 45 diverges one part of the broadcast signals. The diverged broadcast signals are inputted to a distributor circuit 46 so as to be split into two groups. The two groups of the broadcast signals are respectively inputted to the separation lightning arrester circuits 47, 48 connected to the branch terminals 49, 50. Therefore, the broadcast signals are respectively outputted through the separation lightning arrester circuits 47, 48 and the branch terminals 49, 50 to the transmitting amplifiers 10 connected to the respective branch terminals 49, 50.

Moreover, the control signals, inputted to the input terminal 41 from the upstream side of the transmission path and separated by the signal separation lightning arrester circuit 42, are inputted to a branch circuit 51, transmitted to the signal separation lightning arrester circuit 43 through an input/output path of the branch circuit 51 in a low-loss manner, and outputted to the terminal side through the separation lightning arrester circuit 43 and the output terminal 44.

Furthermore, the control signals diverged in the branch circuit 51 are inputted to a data demodulation unit 53 through a LPF 52 which blocks a passage of monitoring signals and selectively allows a passage of control signals. In the data demodulation unit 53, the control signals are converted into control data. The converted control data is inputted to a trunk-line communication control unit 54 constituted with a microcomputer.

According to the control data inputted from the data demodulation unit 53, the communication control unit 54 loads detected signals with regard to the temperature of the above-referred branching device 8, the power supply voltage and so on from a temperature sensor 54a, a voltage detection circuit 54b and so on. The communication control unit 54 outputs data, in which identification information and the like of the communication control unit 54 is added to the detected signals, to a data modulation unit 55, so as to make the data modulation unit 55 generate monitoring signals which indicate the operational status of the above-referred branching device 8.

The monitoring signals, generated in the data modulation unit 55 as described above, are inputted to the branch circuit 51 via a HPF 56, which blocks a passage of control signals and selectively allows a passage of monitoring signals, and outputted from the branch circuit 51 through the signal separation lightning arrester circuit 42 and the input terminal 41 to the upstream side of the transmission path (that is, to the branching device 8 side).

In addition to the trunk-line communication control unit 54, the branching device 8 is also provided with a branch-line communication control unit 57. The communication control unit 57 is constituted, similarly to the communication control unit 54, with a microcomputer, and receives/transmits control signals and monitoring signals from/to the transmitting amplifiers 10 connected to the branch terminals 49, 50.

In other words, if the control signals sent from the monitor device 6 (the control data demodulated by the data demodulation unit 53) are directed to the above-referred branching device 8, the trunk-line communication control unit 54 loads the detected signals in accordance with the control data and performs transmission of monitoring signals, and others as described above. However, if the control signals sent from the monitor device 6 (the control data demodulated by the data demodulation unit 53) are not directed to the above-referred branching device 8, the trunk-line communication control unit 54 transfers the control data to the branch-line communication control unit 57.

When control data is transferred from the communication control unit 54, the branch-line communication control unit 57 determines whether or not the control data is directed to the transmitting amplifiers 10 connected to the branch terminals 49, 50, and, if so, outputs the control data to the data modulation unit 58 so as to make the data modulation unit 58 generate control signals.

Then, the control signals generated, in the data modulation unit 58, are inputted to the distributor circuit 60 through a LPF 59, which blocks a passage of monitoring signals and selectively allows a passage of control signals, and split into two groups in the distributor circuit 60. The two groups of the control signals are respectively outputted to the transmitting amplifiers 10 connected to the branch terminals 49, 50 through the signal separation lightning arrester circuits 47, 48 and the branch terminals 49, 50.

Monitoring signals, inputted from the transmitting amplifiers 10 to the branch terminals 49, 50, are inputted to the data demodulation unit 62 through the signal separation lightning arrester circuits 47, 48, the distributor circuit 60, and a HPF 61. The monitoring signals are temporarily converted into monitoring data, which indicates the operational statuses of the transmitting amplifiers 10, in the data demodulation unit 62, and inputted to the branch-line communication control unit 57.

Then, the branch-line communication control unit transfers the monitoring data to the trunk-line communication control unit 54. The trunk-line communication control unit 54 outputs the monitoring data to the data modulation unit 55 so as to make the data modulation unit 55 generate monitoring signals, which indicate the operational statuses of the transmitting amplifiers 10, and send the monitoring signals toward the monitor device 6 side.

As described above, the branch-line communication control unit 57 relays data received/transmitted between the transmitting amplifiers 10, connected to the branch terminals 49, 50 of the above-referred branching device 8, and the monitor device 6.

Moreover, the branching device 8 is provided with a power supply plug 8a for taking in alternating-current power from an external commercial power supply outlet. The alternating-current voltage inputted from the power supply plug 8a is inputted to the constant voltage circuit 66 through a manually operated power supply switch 63, a fuse 64 provided for protection against overcurrent, and a lightning arrester circuit 65.

The constant voltage circuit 66 is necessary for generating internal power supply (control voltage Vs, driving voltage Vd, and so on which will be described hereinafter) for the above-referred branching device 8. Moreover, the constant voltage circuit 66 also generates constant direct-current voltage Vc (DC 12V), which needs to be supplied to the transmitting amplifiers 10 as driving power supply and to be supplied with respect to the branching devices 8, disposed downstream of the above-referred branching device 8, as power supply instruction signals. The constant direct-current voltage Vc, generated in the constant voltage circuit 66, is inputted to a voltage detection circuit 67.

The voltage detection circuit 67 detects whether or not constant direct-current voltage (DC 12V), which serves as power supply instruction signals, is separated in the signal separation lightning arrester circuit 42 from the inputted signals inputted to the input terminal 41 from the transmission path. That is, the voltage detection circuit 67 detects whether or not constant direct-current voltage (DC 12V), which serves as power supply instruction signals, is inputted with respect to the above-referred branching device 8 from the devices disposed in the upstream side of the transmission path (particularly, the monitor device 6 or other branching devices 8).

When the voltage detection circuit 67 determines that constant direct-current voltage (DC 12V), which serves as power supply signals, is inputted to the input terminal 41, the voltage detection circuit 67 outputs the constant direct-current voltage Vc, generated in the constant voltage circuit 66, to a control voltage generation circuit 68, a drive voltage generation circuit 69, and direct-current voltage output circuits 71, 72, 73 connected to the signal separation lightning arrester circuits 43, 47, 48.

The control voltage generation circuit 68, mentioned herein, generates control voltage Vs (DC 3.3V) for operating the communication control units 54, 57. Control voltage Vs, generated by the control voltage generation circuit 68, is supplied to the respective communication control units 54, 57.

Therefore, communication control units 54, 57 are activated when the power supply switch 63 is in an on-status, and when constant direct-current voltage (DC 12V), which serves as power supply instruction signals, is inputted to the above-referred branching device 8 from the monitor device 6 or other branching devices 8 disposed in the upstream side of the transmission path. Subsequently, the communication control units 54, 57 execute the above-described communication control until the power supply switch 63 is switched to an off-status, or until the input of power supply instruction signals is blocked with respect to the above-referred branching device 8 from the monitor device 6 or other branching devices 8 disposed in the upstream side of the transmission path.

The drive voltage generation circuit 69 generates drive voltage Vd (DC 5V) for operating the internal circuits, except the communication control units 54, 57 constituted with microcomputers: the data modulation units 55, 58, data demodulation units 53, 62, drive circuits 70b in the direct-current voltage output circuits 71, 72, 73, and so on. Generated drive voltage Vd is supplied to the respective units.

Therefore, the operations of the internal circuits except the communication control units 54, 57: the data modulation units 55, 58, data demodulation units 53, 62, drive circuits 70b in the direct-current voltage output circuits 71, 72, 73, and so on, are initiated when the power supply switch 63 is in the on-status, and when constant direct-current voltage (DC 12V), which serves as power supply instruction signals, is inputted to the above-referred branching device 8 from the monitor device 6 or other branching devices 8 disposed in the upstream side of the transmission path. Then, the respective operations are stopped when the power supply switch 63 is switched to the off-status, or when the input of power supply instruction signals is blocked with respect to the branching device 8 from the monitor device 6 or other branching devices 8 disposed in the upstream side of the transmission path.

The direct-current voltage output circuits 71, 72, 73 switch whether or not to output constant direct-current voltage (DC 12V) from the output terminal 44 or the branch terminals 49, 50 through the signal separation lightning arrester circuits 43, 47, 48. In other words, the direct-current voltage output circuits 71, 72, 73 switch whether or not to operate the branching device(s) 8 or the transmitting amplifiers 10 connected to output terminal 44 or the branch terminals 49, 50 of the above-referred branching device 8.

Each of the direct-current voltage output circuits 71, 72, 73 is provided with a normally-closed selecting switch 70a and a drive circuit 70b. The selecting switch 70a switches so as to or not to output constant direct-current voltage Vc, outputted through the constant voltage detection circuit 67, to the signal separation lightning arrester circuits 43, 47, 48. The drive circuit 70b turns on the selecting switch 70a upon receiving the above-described drive voltage Vd.

Therefore, when the above-referred branching device 8 is activated by power supply instruction signals, the power supply instruction signals (DC 12V) are outputted to the branching devices 8 disposed in the downstream side and connected to the output terminal 44, and the transmitting amplifiers 10 connected to the branch terminals 49, 50. As a result, these devices are activated slightly later than the above-referred branching device 8.

It is to be noted that, as shown in FIG. 1, a terminating device 14 is connected to the output terminal 44 of the last branching device 8, which is the farthest from the monitor device 6 among the plurality of branching devices 8 dependently connected along the transmission path constituted with coaxial cables. The terminating device 14 blocks a direct-current component, and terminates the end of the transmission path in the impedance of the path.

Figure 4:
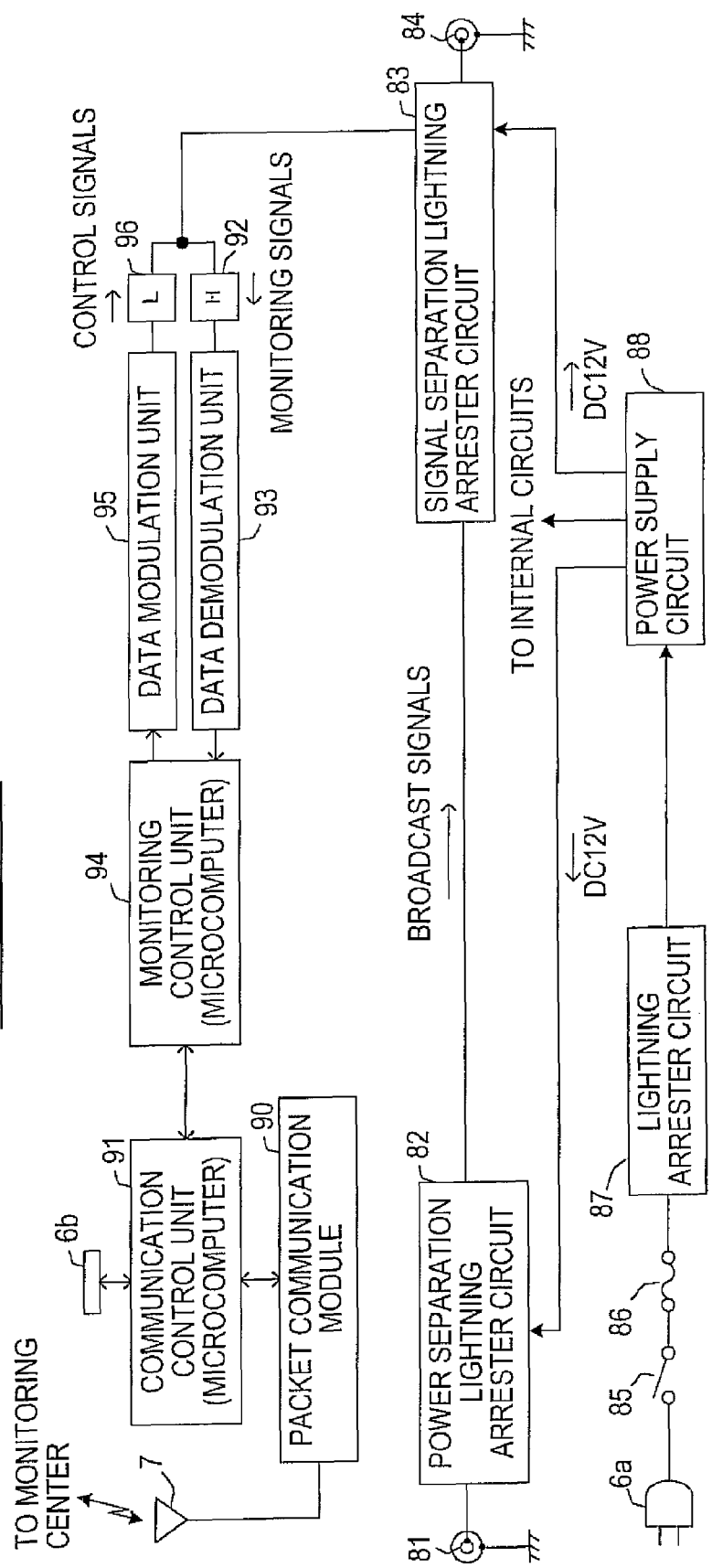
FIG. 4 is a block diagram showing a structure of a monitor device according to the embodiment.

FIG. 4 is a block diagram showing the structure of the monitor device 6.

As shown in FIG. 4, the monitor device 6 includes an input terminal 81 and an output terminal 84. The input terminal 81 is connected to an output terminal of the receiving amplifier 4 through the coaxial cable. The output terminal 84 is connected to the input terminal 41 of the branching device 8 through the coaxial cable.

To the input terminal 81, a power separation lightning arrester circuit 82, constituted with a power supply separation filter and a lightning arrester circuit, is connected. The power supply separation filter outputs broadcast signals, inputted from the receiving amplifier 4 to the input terminal 81, toward the output terminal 84 side, and outputs constant direct-current voltage (DC 12V), generated in a power supply circuit 88 which will be described hereinafter, from the input terminal 81 to the receiving amplifier 4. The lightning arrester circuit absorbs surge voltage generated by lightning and the like.

To the output terminal 84, a signal separation lightning arrester circuit 83, constituted with a filtering circuit and a lightning arrester circuit, is connected. The filtering circuit mixes broadcast signals, inputted through the power separation lightning arrester circuit 82, constant direct-current voltage (DC 12V), generated in a power supply circuit 88 which will be described hereinafter, and control signals to be transmitted to the branching devices 8 and the transmitting amplifiers 10, and outputs the mixed signals and voltage from the output terminal 84 to the terminal side. The filtering circuit also introduces monitoring signals, inputted from the terminal side to the output terminal 84, toward the input path side of control signals. The lightning arrester circuit absorbs surge voltage generated by lightning and the like.

Moreover, the monitor device 6 is provided with a manually-operated power supply switch 85, a fuse 86 for protection against overcurrent, and a lightning arrester circuit 87, for safely taking in alternating-current power supply from an external commercial power source through the power supply plug 6a. Through these units, alternating-current power is supplied from an external power source to the power supply circuit 88.

The power supply circuit 88 generates power supply voltage to be supplied to the internal circuits constituting the monitor device 6, and constant direct-current voltage (DC 12V) to be supplied to the receiving amplifier 4 and the branching devices 8. The constant direct-current voltage (DC 12V), generated in the power supply circuit 88, is supplied to the receiving amplifier 4 through the power separation lightning arrester circuit 82 and the input terminal 81. The constant direct-current voltage is also supplied to other branching devices 8 disposed downstream of the above-referred monitor device 6 through the signal separation lightning arrester circuit 83 and the output terminal 84. The power supply voltage for driving the internal circuits is supplied to the internal circuits which will be explained hereinafter.

Furthermore, the monitor device 6 includes a packet communication module 90 and a communication control unit 91. The packet communication module 90 is connected to a public packet communication network for mobile devices via the antenna 7 for monitoring, and performs wireless data communication with an external monitoring center through the public packet communication network. The communication control unit 91 transmits/receives various data to/from the monitoring center through the packet communication module 90.

Moreover, the monitor device 6 includes a HPF 95, a data demodulation unit 93, and a monitoring control unit 94. The HPF 95 blocks a passage of control signals, and selectively allows a passage of monitoring signals, inputted from the terminal side through the output terminal 84 and the signal separation lightning arrester circuit 83. From the monitoring signals which have passed through the HPF 95, the data demodulation unit restores monitoring data, which indicates the operational status of the branching device 8 or the transmitting amplifier 10 from which the monitoring signals have been sent. The monitoring control unit 94 monitors the operational status of the retransmission system based on the monitoring data restored by the data demodulation unit 93.

When the monitoring control unit 94 detects an error in the operation status of the retransmission system from the monitoring data inputted from the data demodulation unit 93, the monitoring control unit 94 generates report data for reporting the error to the monitoring center, and transfers the report data to the communication control unit 91 so as to report the error in the retransmission system from the communication control unit 91 to an external monitor device.

The monitoring control unit 94 also generates control data for requesting monitoring signals (monitoring data) with respect to the individual branching devices 8 and the transmitting amplifiers 10 in the terminal side, and outputs the control data to the data modulation unit 95 so as to make the data modulation unit 95 convert the control data into control signals for transmission. The control signals, generated by the data modulation unit 95, are inputted to the signal separation lightning arrester circuit 83 through a LPF 96, which blocks a passage of monitoring signals and selectively allows a passage of control signals, and outputted from the signal separation lightning arrester circuit 83 through the output terminal 84 to the terminal side.

The communication control unit 91 not only transmits report data to the monitoring center when the communication control unit 91 receives report data from the monitoring control unit 94, but also executes various control processes in accordance with a control instruction when the communication control unit 91 receives a control instruction from the monitoring center through the antenna 7 for monitoring.

For example, when the communication control unit 91 receives an instruction from the monitoring center so as to request the operational status of the retransmission system, the communication control unit obtains monitoring data, which indicates the operational status being requested, from the monitoring control unit 94, and then transfers the monitoring data to the monitoring center. When the communication control unit 91 receives a control instruction with respect to the branching devices 8 and the transmitting amplifiers 10 disposed in the terminal side, the communication control unit 91 transmits the control instruction to the monitoring control unit 94 so as to make the monitoring control unit 94 transmit control data, corresponding to the control instruction, to the branching devices 8 and the transmitting amplifiers 10.

Moreover, the communication control unit 91 also includes a connector 6*b* for connecting external devices so as to directly connect other information processing devices, such as a portable personal computer and the like, by a cable. When the communication control unit 91 receives an instruction from other information processing devices through the connector 6*b* so as to request the operational status of the retransmission system, the communication control unit 91 executes a process corresponding to the instruction.

The following describes the detail of the structure and the operation of the communication control unit 91.

Figure 5:
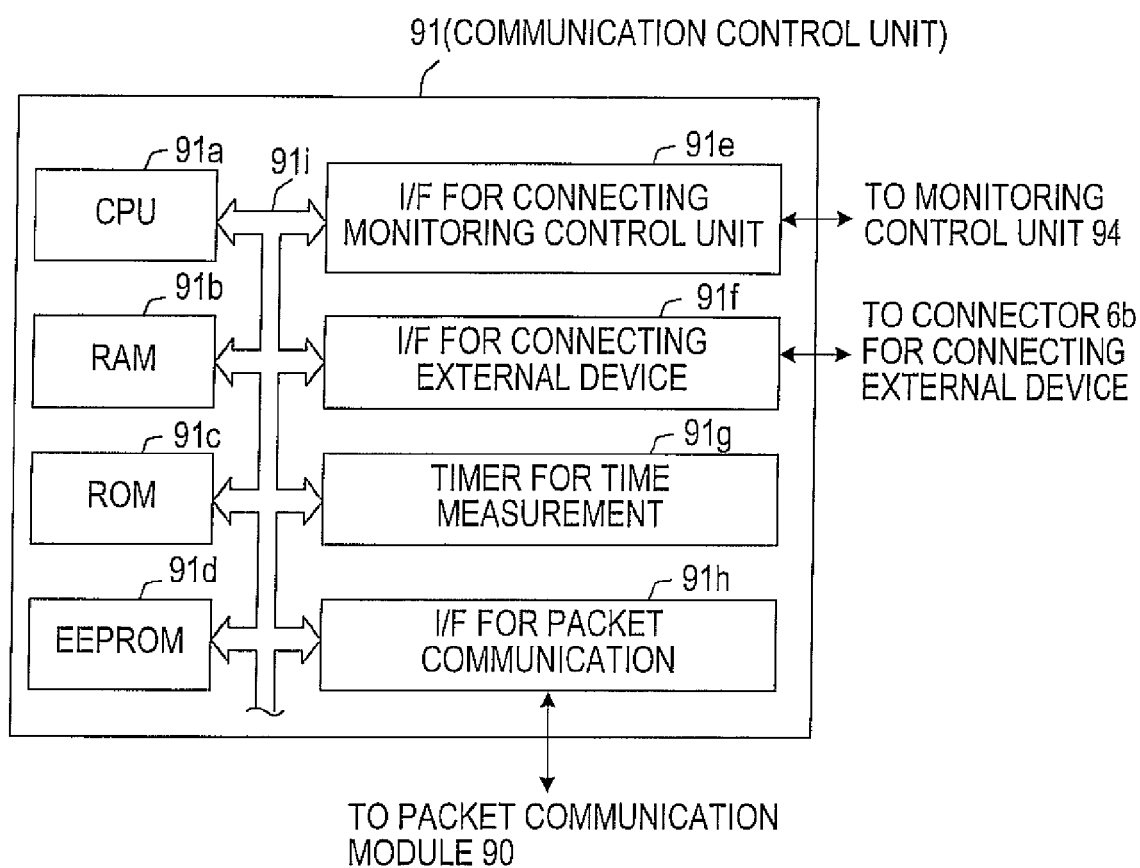
FIG. 5 is a block diagram showing a structure of a communication control unit provided in the monitor device according to the embodiment.

FIG. 5 is a block diagram showing the structure of the communication control unit 91.

As shown in FIG. 5, the communication control unit 91 is constituted with a microcomputer which mainly includes a CPU 91*a*, a RAM 91*b*, and a ROM 91*c*.

The communication control unit 91 includes an EEPROM 91*b*, an I/F (I/F: interface, the same applies hereinafter) 91*e* for connecting a monitoring control unit, an I/F 91*f* for connecting an external device, a timer 91*g* for time measurement, an I/F 91*h* for packet communication, and a bus line 91*i*. The EEPROM 91*b* is a nonvolatile memory. The I/F 91*e* is an I/F for connecting the monitoring control unit 94. The I/F 91*f* is an I/F for connecting the connector 6*b* for connecting an external device. The timer 91*g* measures the time. The I/F 91*h* is an I/F for connecting the packet communication module 90. The bus line 91*i* connects the above-mentioned units to one another. The CPU 91*a* performs data communication with an external device through the above-described I/Fs in accordance with programs stored in the ROM 91*c*.

Figure 6:
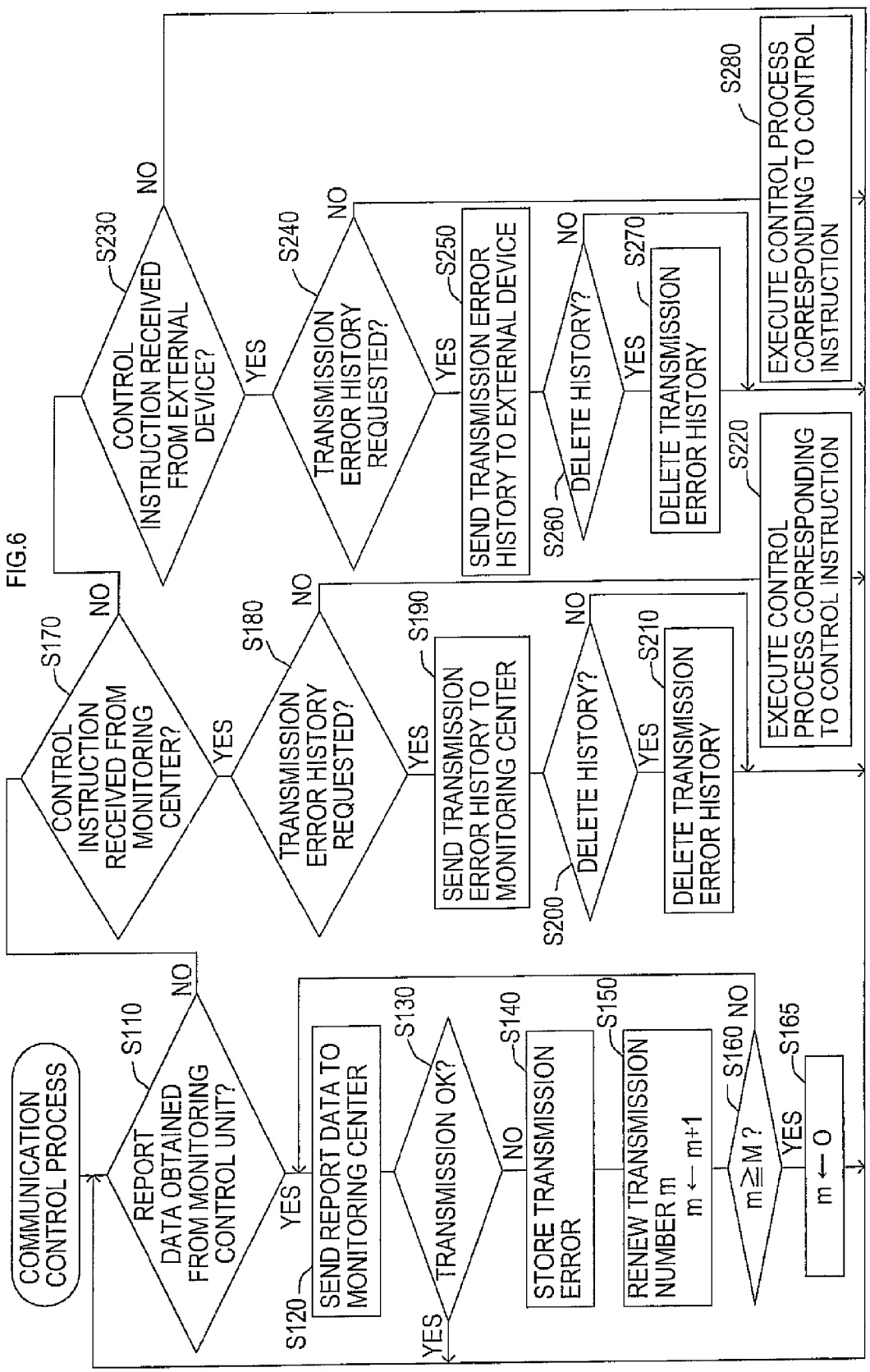
FIG. 6 is a flowchart describing a communication control process executed in the communication control unit.

FIG. 6 is a flowchart describing a communication control process executed in the CPU 91*a*.

This communication control process is repeatedly executed in the CPU 91 when the power is supplied to the monitor device 6 and the communication control unit 91 is activated. When the process is initiated, firstly in S110 (S represents a step), it is determined whether or not report data to be reported to the external monitoring center when an error occurs in the retransmission system has been obtained from the monitoring control unit 94.

If it is determined that report data has been obtained from the monitoring control unit 94, the process proceeds to S120 wherein the report data is transmitted from the packet communication module 90 to the external monitoring center. Then, in S130, it is determined whether or not the transmission of the report data has been successfully performed.

If it is determined in S130 that the transmission of the report data has been successfully performed, the process goes back to S110. On the other hand, if it is determined that the transmission of the report data has not been successfully performed, the process proceeds to S140 wherein the failure is stored as a transmission error history into the EEPROM 91*d*, which serves as a storing device.

As shown in FIG. 7, the EEPROM 91*d* is adopted so as to store, every day, the number of transmission errors (the number of transmission failure) occurred in each period of time on a one-hour basis as a transmission error history, only when a transmission error is detected. In S140, the transmission error history is renewed by reading the time when the transmission error occurs from the timer 91*g* for time measurement, and incrementing (+1) the number of transmission failure in the period of time to which the occurrence time belongs.

Moreover, in S140, the transmission error history (that is, the count value of transmission error in every period) is renewed, wherein the maximum value that is storable in the EEPROM 91*d* (that is, the maximum count value in the counter) is the upper limit. If the count value stored as the transmission error history in the EEPROM 91*d* has already reached the maximum value, the counting operation is suspended until the transmission error history is initialized by an instruction from the monitoring center side.

This is to inhibit, when the count value of the renewal error history has reached the maximum value that can be stored in the EEPROM 91*d* (for example "9999"), the count value from being further incremented and the renewal error history from being returned to the initial value (for example, "0000").

After the transmission error history is renewed in S140 as described above, the process proceeds to S150 wherein the number m of times for transmitting report data is incremented (+1), and to S160 wherein it is determined whether or not the transmission number m has reached a predetermined upper limit value M.

If the transmission number m has not reached the upper limit value M, the process goes back to S120 wherein the report data is retransmitted to the monitoring center. On the other hand, if the transmission number m has reached the upper limit value M, the process proceeds to S165 wherein the transmission number m is set to the initial value "0" so that the transmission number m can be counted when report data is subsequently transmitted. Then, the process goes back to S110.

The processes in S150 and S160 are performed, if transmission of report data is failed, in an attempt so as to transmit the report data as much as possible by executing the transmission up to M-times. When the CPU 91a is activated, the initial value 0 is set for the transmission number m by an initialization process not shown in the drawing.

If it is determined in S110 that report data has not been obtained from the monitoring control unit 94, the process proceeds to S170 wherein it is determined whether or not a control instruction has been received from the external monitoring center through the packet communication module 90.

If it is determined that a control instruction has been received from the monitoring center, the process proceeds to S180 wherein it is determined whether or not the received control instruction is an instruction requesting the transmission error history stored in the EEPROM 91d. If it is determined that the control instruction from the monitoring center is not an instruction requesting the transmission error history, the process proceeds to S220, wherein the control process corresponding to the received instruction is performed, and then back to S110.

On the other hand, if it is determined that the control instruction from the monitoring center is an instruction requesting the transmission error history, the process proceeds to S190 wherein the transmission error history is read from the EEPROM 91d, and sent to the monitoring center through the packet communication module 90.

After the transmission error history is sent to the monitoring center in S190, the process proceeds to S200 wherein an inquiry is made to the monitoring center whether or not to delete the currently-sent transmission error history from the EEPROM 91d.

As a result of the inquiry, if there is a response so as to delete the transmission error history, the process proceeds to S210 wherein the transmission error history stored in the EEPROM 91d is deleted, and then back to S110. On the other hand, if there is no response for deleting the transmission error history, the process directly goes back to S110.

If it is determined in S170 that no control instruction has been received from the monitoring center, the process proceeds to S230 wherein it is determined whether or not a control instruction has been received from an information processing device (to be referred to as an external device) connected to the connector 6b for connecting an external device through the I/F 91f for connecting an external device.

If it is determined that a control instruction has not been received from the external device, the process goes back to S110. On the other hand, if it is determined that a control instruction has been received from the external device, the process proceeds to S240 wherein it is determined whether or not the received control instruction is an instruction requesting the transmission error history stored in the EEPROM 91d.

If it is determined that the control instruction from the external device is not an instruction requesting the transmission error history, the process proceeds to S280 wherein a control process corresponding to the received instruction is executed, and then back to S110. On the other hand, if the control instruction from the external device is an instruction requesting the transmission error history, the process proceeds to S250 wherein the transmission error history is read from the EEPROM 91d, and sent to the external device (the information processing device), connected to the connector 6b for connecting an external device, through the I/F for connecting an external device.

After the transmission error history is sent to the external device in S250, the process proceeds to S260 wherein an inquiry is made to the external device whether or not to delete the currently-sent transmission error history from the EEPROM 91d.

As a result of the inquiry, if there is a response so as to delete the transmission error history, the process proceeds to S270 wherein the transmission error history stored in the EEPROM 91d is deleted, and then back to S110. On the other hand, if there is no response for deleting the transmission error history, the process directly goes back to S110.

As described above, the retransmission system according to the present embodiment is provided with the monitor device 6 that monitors the operational statuses of the branching devices 8 and the transmitting amplifiers 10 constituting the retransmission system. In the monitor device 6, the monitoring control unit 94 individually sends control signals to the respective units (the branching devices 8 and the transmitting amplifiers 10) so as to obtain, from the respective unit, monitoring signals (monitoring data) which indicate the operational statuses of the respective units. If any error is detected from the obtained monitoring data, the monitoring control unit 94 generates report data for reporting the error to the monitoring center, and sends the report data to the communication control unit 91.

The communication control unit 91 sends the report data to the external monitoring center through the packet communication module 90 which is capable of data communication with external devices by using a public packet communication network for mobile devices. During the transmission of the report data, the communication control unit 91 monitors whether or not the transmission of the report data is successfully performed. If any error occurs in regard to the transmission of the report data, the error is stored in the EEPROM 91d as the transmission error history.

The transmission error history stored in the EEPROM 91d can be read from the monitoring center through a public packet communication network, or an external device (information processing device) directly connected through the connector 6b for connecting an external device, and, in addition, can be deleted if necessary.

Therefore, by the monitor device 6 according to the present embodiment, when an error in the retransmission system cannot be reported from the monitor device 6 to an external monitoring center, whether the occurrence of the error is due to the public packet communication network being crowded, or an operation failure in the monitor device can be easily and accurately found out by the transmission error history stored in the EEPROM 91d.

As a result, according to the present embodiment, an inspection/repair of the retransmission system can be efficiently performed, when an error in the retransmission system cannot be reported from the monitor device 6 to the monitoring center, and the cost required for the work can be reduced.

Moreover, the transmission error history stored in the EEPROM 91*d* can be checked by an administrator in the monitoring center side performing a remotely-controlled operation by using a public packet communication network. The transmission error history can be also checked by a user of an information processing device in a working site by connecting an information processing device to the monitor device 6. As a result, the transmission error history can be efficiently and easily checked.

Since the transmission error history stored in the EEPROM 91*d* can be deleted when the history is checked, only unchecked transmission error history may be stored in the EEPROM 91*d*, which can, in turn, keep the capacity of the EEPROM 91*d* to the bare minimum.

Particularly in the present embodiment, the number of occurrence of transmission errors in the predetermined period of time (one-hour basis) is counted, and the value of the counting is stored in the EEPROM 91*d* as the transmission error history. Therefore, the capacity of the EEPROM 91*d* can be reduced as compared to a case wherein the time when a transmission error occurs is sequentially stored.

Furthermore, the monitor device according to the present embodiment is configured so as to perform the transmission of report data up to M-times when the transmission of report data to the monitoring center is failed. Therefore, the probability that report data is sent to the monitoring center can be increased, and a delay for inspecting the retransmission system due to an error in transmitting report data can be inhibited.

It is to be noted that, in the present embodiment, the receiving antenna 2 and the receiving amplifier 4 correspond to the receiving device of the broadcast radio wave retransmission system according to the present invention, and that the branching devices 8, the transmitting amplifiers 10, and the transmitting antennas 12 correspond to the transmitting devices of the broadcast radio wave retransmission system according to the present invention.

Moreover, in the monitor device 6, the packet communication module 90 and the monitoring control unit 94 respectively correspond to the packet communication device and the communication status determination device according to the present invention. In the monitoring control unit 6, the EEPROM 91*d* and the I/F 91*f* for connecting an external device respectively correspond to the storage device and the communication interface according to the present invention.

Furthermore, in the communication control process executed by the CPU 91*a* of the monitoring control unit 6, the processes performed in S120 and S140 respectively correspond to the report data transmitting device and the first transmission error history storage device according to the present invention. The processes performed in S150 and S160 correspond to the retransmission instruction device according to the present invention. The processes performed in S190, S210, S250, and S270 respectively correspond to the transmission error history transmitting device, the transmission error history deleting device, the transmission error history outputting device, and the second transmission error history deleting device according to the present invention.

Although the above has described an embodiment of the present invention, the present invention is not limited to the above-described embodiment, but can be carried out in various ways.

For example, in the above-described embodiment, when transmission of report data is failed, the report data is retransmitted immediately after the failure. However, the communication control unit 91 of the monitor device 6 may be configured such that, based on the transmission error history stored in the EEPROM 91*b*, an administrator can set the hour for retransmission to the hour when the public packet communication network is not crowded and a transmission error is less likely to occur, and that retransmission of the report data, previously failed to be transmitted, can be performed during that hour, for example.

Moreover, although the above-described embodiment explains with regard to the retransmission system that retransmits broadcast radio waves for mobile broadcasting, the present invention may be applied, in the same manner as in the above-described embodiment, to a system that retransmits broadcast radio waves for other types of broadcasting, such as CS digital broadcasting, BS digital broadcasting, digital terrestrial broadcasting, and so on to areas to which the broadcast radio waves do not reach, and the same effect can be exhibited.

Furthermore, the above-described embodiment explains with regard to the system that retransmits broadcast signals from the transmitting antennas 12 by amplifying signals received from the receiving antenna 2 and transmitting the amplified signals up to the transmitting antennas 12. However, the present invention may be applied to a system which converts (down-converts) frequencies of signals received from the receiving antenna 12 and retransmits broadcast signals from the transmitting antennas 12, and the same effect can be exhibited.

For example, one type of system is known as a retransmission system for mobile broadcasting wherein a receiving antenna receives broadcast radio waves (TDM signals (TDM: time-division multiplex)) distributed in the frequency band at 12 GHz from a satellite, the received signals (TDM signals) are converted into broadcast signals in the band at 2.8 GHz (CDM signals (CDM: code-division multiplex)) and transmitted to transmitting antennas so that the broadcast signals (CDM signals) are retransmitted from the transmitting antennas. The present invention may be applied to this type of retransmission system, and the same effect as in the above-described embodiment can be exhibited.

In addition, the above-described embodiment describes that broadcast radio waves are retransmitted from the plurality of transmitting antennas 12 to the transmission areas of the respective antennas 12 by providing the branch-line communication control unit 57 in each of the branching devices 8, and transmitting broadcast signals from the transmitting amplifier 10 to a plurality of transmitting amplifiers 10 and the plurality of transmitting antennas 12. However, the present invention may also be applied to a system that retransmits broadcast radio waves from one transmitting antenna 12, and the same effect as the above-described embodiment can be exhibited.

What is claimed is:

1. A monitor device provided to a broadcast radio wave retransmission system that comprises a receiving device and a transmitting device, the receiving device receiving broadcast radio waves transmitted from a broadcast station, and processing received signals so as to output the received signals as broadcast signals for retransmission, the transmitting device being disposed in an area where the broadcast radio waves do not reach, amplifying the broadcast signals to a predetermined transmission level, and outputting the broadcast signals to a transmitting antenna so that broadcast radio waves corresponding to the broadcast signals are retransmitted from the transmitting antenna, the monitor device monitoring an operational status of the system and, when an error occurs, reporting the error to an external monitoring center, the monitor device comprising:

a packet communication device performing wireless data communication with an external device through a public packet communication network for mobile devices;

a report data transmitting device that transmits report data, when an error occurs in the system, so as to report the error to the monitoring center through the packet communication device;

a communication status determination device that determines whether or not transmission of report data is successfully performed by the report data transmitting device;

a transmission error history storage device that stores an error, when the communication status determination device determines that an error occurs in transmission of the report data, as a transmission error history in a storage device; and a retransmission instruction device that makes the report data transmitting device retransmit the report data, when the communication status determination device determines that an error occurs in transmission of the report data;

wherein the retransmission instruction device is configured to:
   count a number of times the report data is transmitted;
   determine whether or not the number of times the report data is transmitted has reached a predetermined upper limit value (M); and
   retransmit the report data to the monitoring center when the number of times of the transmission has not reached the upper limit value (M), and set the number of times of the transmission to an initial value ("O") when the number of times of the transmission has reached the upper limit value (M) so that the process proceeds to transmission of report data to be subsequently transmitted.

2. The monitor device according to claim 1, comprising a transmission error history transmitting device that sends the transmission error history, stored in the storage device, from the packet communication device to an external device including the monitoring center, when the packet communication device receives a transmission request for the transmission error history from the external device, through the public packet communication network.

3. The monitor device according to claim 2, comprising a transmission error history deleting device, associated with the external device, that deletes the transmission error history, stored in the storage device, when the packet communication device receives, from the external device through the public packet communication network, a deletion instruction for deleting the transmission error history.

4. The monitor device according to claim 1, comprising:
a communication interface, to which an external information processing device is directly connected so as to perform data communication; and
a transmission error history output device that outputs the transmission error history, stored in the storage device, to the information processing device through the communication interface, when the transmission error history output device receives a transmission request for the transmission error history from the information processing device through the communication interface.

5. The monitor device according to claim 4, comprising a transmission error history deleting device, associated with the communication interface, that deletes the transmission error history, stored in the storage device, when the transmission error history deleting device, associated with the communication interface, receives, from the information processing device through the communication interface, a deletion instruction for deleting the transmission error history.

6. The monitor device according to claim 4, further comprising:
a transmission error history deleting device, associated with the external device, that deletes the transmission error history, stored in the storage device, when the packet communication device receives a deletion instruction, from the external device through the public packet communication network, for deleting the transmission error history; and
a transmission error history deleting device, associated with the communication interface, that deletes the transmission error history, stored in the storage device, when the transmission error history deleting device, associated with the communication interface, receives a deletion instruction, from the information processing device through the communication interface, for deleting the transmission error history.

7. The monitor device according to claim 1, wherein the transmission error history storage device performs counting, in each predetermined period of time, in regard to a number of errors determined in transmission of the report data by the communication status determination device, and stores a result of the counting in the storage device as a transmission error history 8. The monitor device according to claim 1, wherein the storage device is a nonvolatile memory that is capable of maintaining a memory content, even when power supply is cut off.

9. A broadcast radio wave retransmission system comprising:
a receiving device that receives broadcast radio waves transmitted from a broadcast station, and processes received signals so as to output the received signals as broadcast signals for retransmission;
a transmitting device that is disposed in an area where the broadcast radio waves do not reach, amplify the broadcast signals to a predetermined transmission level, and output the broadcast signals to a transmitting antenna so that broadcast radio waves corresponding to the broadcast signals are retransmitted from the transmitting antenna; and
a monitor device provided to a broadcast radio wave retransmission system that comprises a receiving device and a transmitting device, the receiving device receiving broadcast radio waves transmitted from a broadcast station, and processing received signals so as to output the received signals as broadcast signals for retransmission, the transmitting device being disposed in an area where the broadcast radio waves do not reach, amplifying the broadcast signals to a predetermined transmission level, and outputting the broadcast signals to a transmitting antenna so that broadcast radio waves corresponding to the broadcast signals are retransmitted from the transmitting antenna, the monitor device monitoring an operational status of the system and, when an error occurs, reporting the error to an external monitoring center, the monitor device comprising:
a packet communication device performing wireless data communication with an external device through a public packet communication network for mobile devices;
a report data transmitting device that transmits report data, when an error occurs in the system, so as to report the error to the monitoring center through the packet communication device;

a communication status determination device that determines whether or not transmission of report data is successfully performed by the report data transmitting device;

a transmission error history storage device that stores an error, when the communication status determination device determines that an error occurs in transmission of the report data, as a transmission error history in a storage device; and a retransmission instruction device that makes the report data transmitting device retransmit the report data, when the communication status determination device determines that an error occurs in transmission of the report data;

wherein the retransmission instruction device is configured to:

count a number of times the report data is transmitted;

determine whether or not the number of times of the report data is transmitted has reached a predetermined upper limit value (M); and retransmit the report data to the monitoring center when the number of times of the transmission has not reached the upper limit value (M), and set the number of times of the transmission to an initial value ("O") when the number of times of the transmission has reached the upper limit value (M) so that the process proceeds to transmission of report data to be subsequently transmitted.

10. A monitor device provided to a broadcast radio wave retransmission system comprising a receiving device and a transmitting device, the receiving device receiving broadcast radio waves transmitted from a broadcast station, and processing received signals so as to output the received signals as broadcast signals for retransmission, the transmitting device being disposed in an area where the broadcast radio waves do not reach, amplifying the broadcast signals to a predetermined transmission level, and outputting the broadcast signals to a transmitting antenna so that broadcast radio waves corresponding to the broadcast signals are retransmitted from the transmitting antenna, the monitor device monitoring an operational status of the system and, when an error occurs, reporting the error to an external monitoring center, the monitor device comprising:

a packet communication device performing wireless data communication with an external device through a public packet communication network for mobile devices;

a report data transmitting device that transmits report data, when an error occurs in the system, so as to report the error to the monitoring center through the packet communication device;

a communication status determination device that determines whether or not transmission of report data is successfully performed by the report data transmitting device;

a transmission error history storage device that stores error information, when the communication status determination device determines that an error occurs in transmission of the report data, as a transmission error history in a storage device, such error information including at least a value of a total number of errors occurring during a predetermined time period; and a retransmission instruction device that makes the report data transmitting device retransmit the report data, when the communication status determination device determines that an error occurs in transmission of the report data, wherein the retransmission instruction device is configured to:

count a number of times the report data is transmitted;

determine whether or not the number of times the report data is transmitted has reached a predetermined upper limit value (M); and retransmit the report data to the monitoring center when the number of times of the transmission has not reached the upper limit value (M), and set the number of times of the transmission to an initial value ("O") when the number of times of the transmission has reached the upper limit value (M) so that the process proceeds to transmission of report data to be subsequently transmitted.

11. The monitor device according to claim 10, further comprising a transmission error history transmitting device that sends the transmission error history, stored in the storage device, from the packet communication device to an external device including the monitoring center, when the packet communication device receives a transmission request for the transmission error history from the external device, through the public packet communication network.

12. The monitor device according to claim 10, wherein the predetermined time period is one hour.

* * * * *